United States Patent [19]

Moriki et al.

[11] Patent Number: 4,599,545
[45] Date of Patent: Jul. 8, 1986

[54] SERVOMOTOR CONTROLLER

[75] Inventors: Etsuzo Moriki, Kasai; Yoshifumi Miyazaki, Hyogo; Torahiko Nonoue, Kakogawa, all of Japan

[73] Assignee: Sanyo Electric Co., Ltd., Moriguchi, Japan

[21] Appl. No.: 681,781

[22] Filed: Dec. 14, 1984

[30] Foreign Application Priority Data

May 15, 1984 [JP] Japan ................................ 59-98279

[51] Int. Cl.⁴ ............................................. G05B 5/00
[52] U.S. Cl. .................... 318/314; 318/326; 318/327; 318/341; 318/599; 318/329
[58] Field of Search ............... 318/311, 313, 314, 315, 318/316, 317, 318, 323, 326, 327, 329, 332, 341, 345 A, 345 E, 599, 600, 601, 603, 604, 605, 606, 607, 608

[56] References Cited

U.S. PATENT DOCUMENTS

| | | | |
|---|---|---|---|
| 3,215,918 | 11/1965 | Lichowsky | 318/302 |
| 3,621,353 | 11/1971 | Matley | 318/314 |
| 4,023,085 | 5/1977 | Bishop et al. | 318/603 X |
| 4,061,950 | 12/1977 | Kayanuma | 318/314 |
| 4,072,884 | 2/1978 | Treadwell | 318/314 |
| 4,086,521 | 4/1978 | Bühler et al. | 318/314 X |
| 4,216,419 | 8/1980 | Van Dam et al. | 318/314 X |
| 4,243,921 | 1/1981 | Tamura et al. | 318/314 |
| 4,271,382 | 6/1981 | Maeda et al. | 318/314 X |
| 4,354,146 | 10/1982 | Tenmyo et al. | 318/341 |
| 4,441,061 | 4/1984 | Yoshida et al. | 318/329 |
| 4,500,822 | 2/1985 | Tajima et al. | 318/326 X |
| 4,506,202 | 3/1985 | Tajima et al. | 318/341 X |

Primary Examiner—William M. Shoop, Jr.
Assistant Examiner—Shik Luen Paul Ip
Attorney, Agent, or Firm—Wenderoth, Lind & Ponack

[57] ABSTRACT

A servomotor controller of a Phase Locked Loop type, in which a phase control circuit and speed control circuit are composed of digital circuits, makes it possible to set a speed of the servomotor and to change the speed with ease and accuracy. The controller also makes it possible to reduce the assembling time with smaller number of parts and high reliability is obtained when the controller is used in various apparatus since the controller can be composed of a one chip integrated circuit. One can choose freely either quick start mode, which makes the speed increase quickly up to the set speed, or soft start mode, which makes the speed increase slowly.

14 Claims, 8 Drawing Figures

SERVOMOTOR CONTROLLER

BACKGROUND OF THE INVENTION

1. Field of the Invention

This invention relates to a controller of a PLL (phase locked loop) type for a servomotor, and more particularly to a controller suitable for a DC servomotor used as a drive source for a scanning unit of a copying machine with reduction and enlargement functions, or for a video/audio disc player or a video/audio tape recorder which need a plurality of rotational speeds.

2. Description of the Prior Art

An electrophotographic copying machine needs a synchronization of the circumferential speed of a photosensitive drum with a document scanning speed. Accordingly, a copying machine having reduction and enlargement functions contains a gear-system speed change apparatus interposed between a motor used as the drive source common to the photosensitive drum and the document scanning unit and the driven units (the drum and the document scanning unit) so that a gear ratio corresponding to the magnification is selected to thereby synchronize the drum and scanning unit. Recently, the choice of magnification ratios has increased, so that the gear-system speed change apparatus has become increasingly larger in size. Hence, the copying machine is provided with a servomotor used only for document scanning and driven at a predetermined speed in synchronism with the photo-sensitive drum rotating at a constant speed, thereby allowing the miniaturization of the copying machine.

Now, in order to precisely control the servomotor, a phase and speed control system is used which detects not only the rotational speed of the motor but also the phase thereof so as to control them to meet predetermined conditions. Such a system has been well-known as disclosed in the U.S. Pat. No. 3,215,918 and No. 3,621,353, the control circuits of these inventions comprising analog circuits. Recently, a digital circuit has been used for the control unit in which a servo loop employs an analog amplifier and an analog phase compensating circuit so that digital and analog devices are mixed.

Hence, since the servo loop is subjected to gain adjustment and phase compensation, a number of components, such as capacitors and resistances, are required, thereby having the defect that the number of parts increases to complicate the circuitry. Additionally, an adjusting portion is needed for adjusting the constants of the circuitry elements. Also, the control circuit is defective in that, in order to avoid such adjustment, precise computation need previously be carried out and circuitry elements of a high accuracy must be used. Furthermore, even when a similar control circuit is used, if the motor or load is different, there is difficulty in that the circuit constants must be changed correspondingly to the different motor or load.

SUMMARY OF THE INVENTION

An object of the invention is to eliminate the above defects, in other words, the servo loop is formed in a digitized circuit to thereby simplify the circuit and reduce the number of parts in use.

Another object of the invention is to provide a servomotor controller which can easily and quickly set or change the desired speed of the servomotor.

Still another object of the invention is to provide a servomotor controller not requiring circuitry elements of a high accuracy.

A further object of the invention is to provide a servomotor controller which can quickly obtain a desired speed of the servomotor.

A still further object of the invention is to provide a compact copying machine having reduction and enlargement functions.

Yet another object of the invention is to provide a servomotor controller capable of being composed as a one-chip integrated circuit.

These and other objects and advantages of the invention will become more apparent upon a reading of the following detailed description in accordance with the accompanying drawings.

PREFERRED EMBODIMENTS OF THE INVENTION

This invention is characterized basically in that a servomotor controller of a PLL (phase locked loop) type comprises a rotation detector rotates in association with said servomotor and outputs a pulse signal corresponding to the rotation of said servomotor, a phase reference signal generating unit providing with a registering means for storing data specifying a pulse cycle period of said phase reference signal, a phase control unit which detects a phase difference between said phase reference signal and the output of said rotation detector, thereby outputting the detection results in numerical values, a speed reference signal generating unit provided with a registering means for storing data specifying a pulse width of said speed reference signal, a speed control unit which uses said speed reference signal to detect the cycle period of the output of said rotation detector, thereby outputting the detection results in numerical values, a full adder for adding the outputs of said phase control unit and said speed control unit, and a signal converting unit for outputting a motor speed control signal corresponding to the computation result of said full adder.

Figure 1:
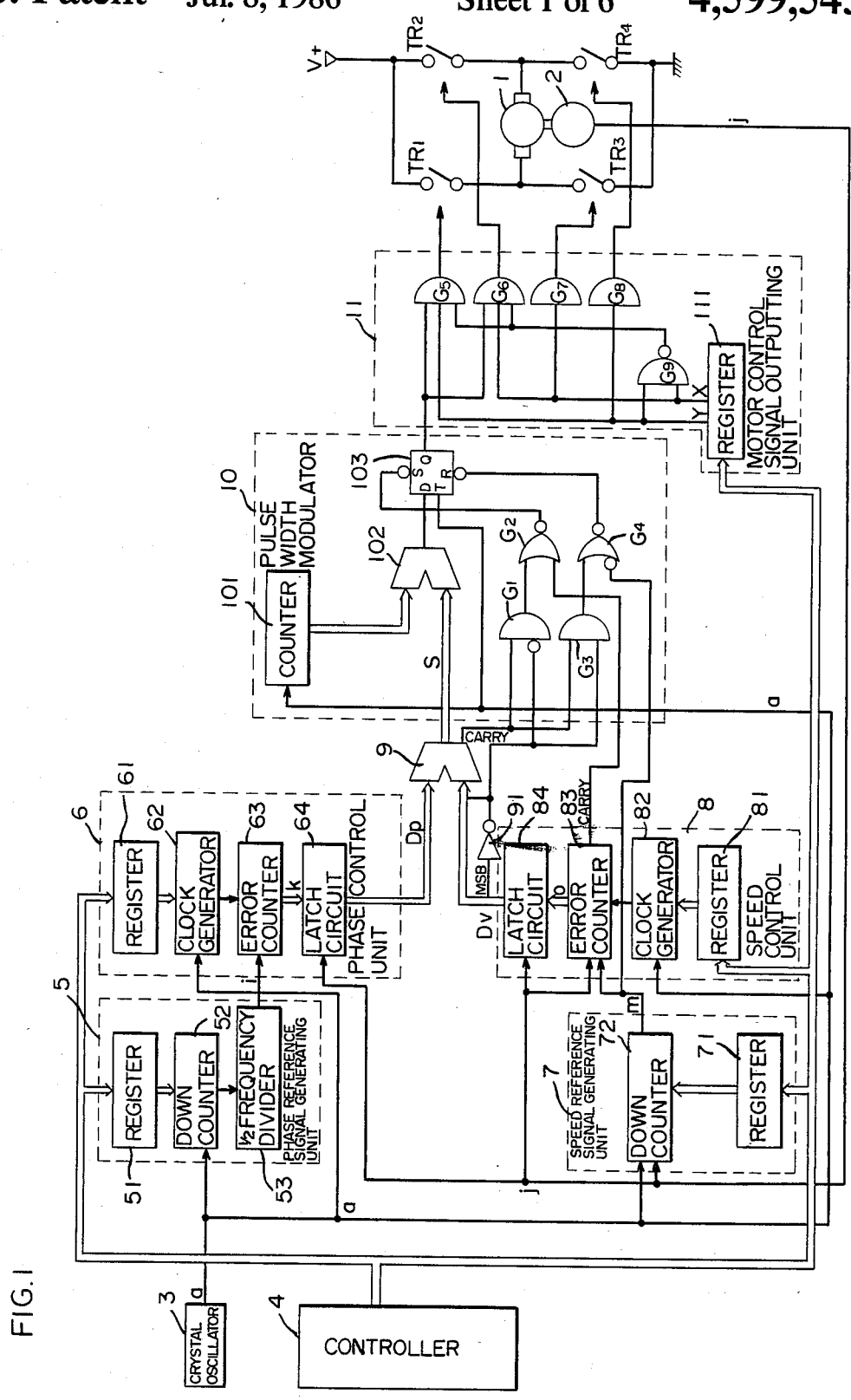
FIG. 1 is a block diagram of an embodiment of a servomotor controller of the invention.

Next, an embodiment of the servomotor controller of the invention will be described in accordance with the drawings. Referring to FIG. 1, reference numeral 1 designates a DC servomotor for document scanning at, for example, a copying machine, the servomotor 1 being adapted to normally rotate when switching transistors $TR_1$ and $TR_4$ are on and reversely rotate when those $TR_2$ and $TR_3$ are on. To the motor 1 is directly connected a rotary encoder 2 for detecting the rotational speed of the motor 1, so that the encoder 2 outputs a signal j (see FIG. 4-(j)) of a frequency proportional to the number of rotations of motor 1, the signal j being fed to a latch circuit 64 of a phase control unit 6, an error counter 83 and a latch circuit 84 of a speed control unit 8, and a down counter 72 of a speed reference signal generating unit 7.

Figure 3:
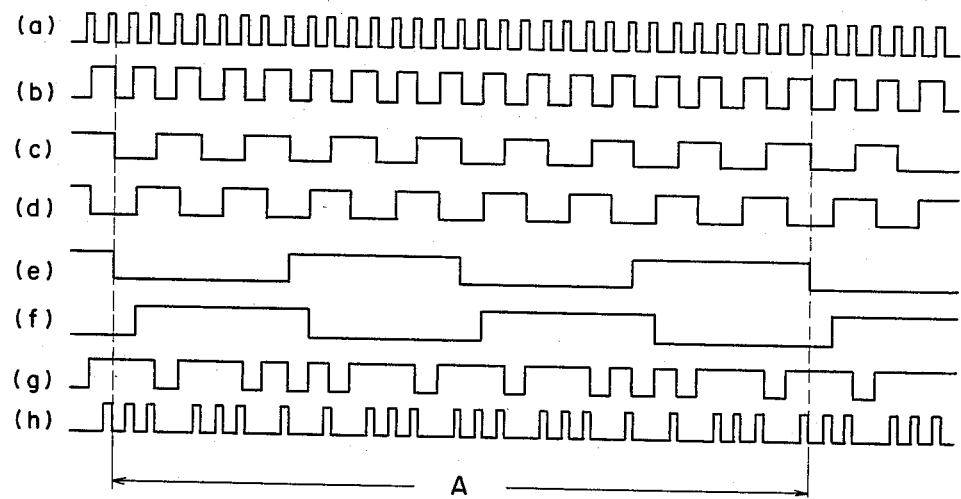
FIG. 3 is a timing chart explanatory of operation of the clock generator.

Reference numeral 3 designates a crystal oscillator for outputting a clock pulse a (FIG. 3-(a)) used as a reference signal of this servomotor controller, which is fed to a down counter 52 of a phase reference signal generating unit 5, a clock generator 62 for an error counter 63 of the phase control unit 6, the down counter 72, a clock generator 82 for the error counter 83 of the speed control unit 8, and a counter 101 and the trigger terminal T of a D-flip-flop 103 of a pulse width modulator 10.

Reference numeral 4 designates a controller comprising a microcomputer or a ROM (read only memory) used for setting into a register 51 of the phase reference signal generating unit 5, a register 61 of the phase control unit 6, a register 71 of the speed reference signal generating unit 7, a register 81 of the speed control unit 8, and a register 111 of a motor control signal outputting unit 11, the required numerical values for driving an document scanning unit at the predetermined speed and in the desired direction according to the order of operation of the copying machine.

Next, an explanation will be given on the phase reference signal generating unit 5. This unit 5 obtains as an output of a ½ frequency divider 53 a signal of cycle period Tp (=T) equal to the cycle period T of output signal j of the rotary encoder 2 when the motor 1 rotates at the desired speed, and outputs the signal of cycle period Tp to an error counter 63 of the phase control unit 6. In other words, the numerical values corresponding to the cycle period T are set into the register 51 by the controller 4 in order to specify the cycle period of signal i for the reference phase of rotation of the motor 1, and are stored in the register 51. The down counter 52 is presetable and down-counts the clock pulse a, outputs the borrow signal, and reads the set numerical values of the register 51, and can preset the values. Simultaneously the borrow signal inverts the output of the ½ frequency divider 53. Since the phase reference signal generating unit 5 repeats the above operation, the cycle period Tp (FIG. 4-(i)) of the output i of the ½ frequency divider 53 becomes two times the product of the cycle period of clock pulse a and the set value of the register 51.

Figure 2:
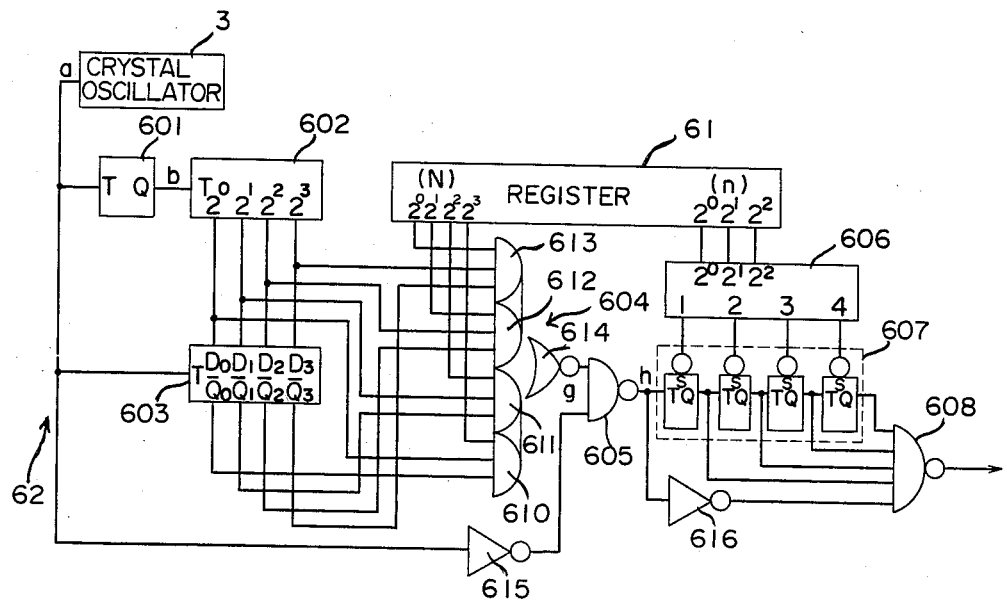
FIG. 2 is a detailed block diagram of a clock generator.

Next, an explanation will be given on the phase control unit 6. This unit 6 serves to detect a phase error in the rotation of motor 1 so that the phase is allowed to coincide with that of output signal i from the phase reference signal generating unit 5, and comprises a 7-bit register 61, a clock generator 62 shown in detail in FIG. 2, an 8-bit error counter 63, and an 8-bit latch circuit 64.

The clock generator 62 functions to output to the error counter 63 a clock signal h (see FIG. 3-(h)) produced by thinning out, i.e.—reducing, the number of clock pulses related to the numerical values set in the register 61 from the clock pulses a of oscillator 3, thereby controlling the counting speed of error counter 63. Next, an explanation will be given on the construction and operation of clock pulse generator 62 in accordance with FIGS. 2 and 3.

The clock pulse a of the output from the oscillator 3 is frequency-divided by a ½ frequency divider 601 so as to be a signal b (FIG. 3-(b)) which is input to a 4-bit counter 602, 4-bit outputs $2^0, 2^1, 2^2$ and $2^3$ of the counter 602 being input to corresponding bits $D_0, D_1, D_2$ and $D_3$ of a 4-bit D-flip-flop 603 respectively. The D-flip-flop 603 is input the clock pulse a so that the output of D-flip-flop 603 delays to an extent of one clock. The outputs of D-flip-flop 603 are the inverted outputs $\overline{Q}_0, \overline{Q}_1, \overline{Q}_2$ and $\overline{Q}_3$ thereof. FIGS. 3-(c) and -(e) show the outputs $2^0$ and $2^2$ of counter 602 and FIGS. 3-(d) and -(f) show the inverted outputs $\overline{Q}_0$ and $\overline{Q}_2$ of D-flip-flop 603 delayed by one clock from the outputs $2^0$ and $2^2$.

The 4-bit outputs $2^0, 2^1, 2^2$ and $2^3$ of the counter 602 are each input to one input of 3-input AND gates 610, 611, 612 and 613 of an AND/OR inverter gate 604, the outputs $\overline{Q}_0, \overline{Q}_1, \overline{Q}_2$ and $\overline{QHD}$ 3 of D-flip-flop 603 being each input to one input of the same AND gates 610, 611, 612 and 613.

Into the register 61 are set a 4-bit numerical value N (0, 1, 2 ... 15) and a 3-bit numerical value n (0, 1, 2, 3 and 4) and the numerical values N: $2^0, 2^1, 2^2$ and $2^3$ are each input to one remaining input of each AND gate 613, 612, 611 or 610, the outputs of AND gates 610 to 613 being input to a 4-input NOR gate 614, the output of NOR gate 614, that is, the output g (FIG. 3-(g)) of AND/OR inverter gate 604 being input to one input of a NAND gate 605. The clock pulse a is inverted by an inverter 615 and input to the other input of NAND gate 605. The output g of NOR gate 614 (as shown in FIG. 3-(g) is exemplary when N=10 ($2^0, 2^1, 2^2, 2^3$=0,1,0,1), and a signal h has shown in FIG. 3-(h) is obtained from the NAND gate 605. Since each input (N) of each three inputs of AND gates 610 to 613 is fixed, one cycle period of operation of the abovementioned circuit is decided by the four outputs from the counter 602 for counting the output of ½ frequency divider 601 and the four outputs from the D-flip-flop 603 to thereby become 32 cycle periods (a range shown by A in FIG. 3) of clock pulse a. The AND/OR inverter gate 604 is so constructed that the N-shots of clock pulse a is thinned out from 32-shots thereof. In other words, the output signal h of NAND gate 605 shown in FIG. 3-(h) comprises the 32-shots of clock pulse a from which 10-shots thereof are thinned out on an average.

The other numerical value n set into the register 61 is input to a decoder 606 and converted into 4-bit data such that the n-number corresponding to the number of logic "1" is as shown below in Table 1.

TABLE 1

| n | Input | | | Output | | | |
|---|---|---|---|---|---|---|---|
|   | $2^0$ | $2^1$ | $2^2$ | 1 | 2 | 3 | 4 |
| 0 | 0 | 0 | 0 | 0 | 0 | 0 | 0 |
| 1 | 1 | 0 | 0 | 1 | 0 | 0 | 0 |
| 2 | 0 | 1 | 0 | 1 | 1 | 0 | 0 |
| 3 | 1 | 1 | 0 | 1 | 1 | 1 | 0 |
| 4 | 0 | 0 | 1 | 1 | 1 | 1 | 1 |

The 4-bit outputs "1,2,3 and 4" of decoder 606 are input to the low active direct set terminals of a counter 607 comprising four flip-flops connected in series with each other and capable of being directly set. The output of NAND gate 605 is input to the trigger terminal T of the initial stage flip-flop of the counter 607 and also to a NAND gate 608 through an inverter 616, the NAND gate 608 also being fed an output of each of the four flip-flops of the counter 607. From the abovementioned construction, the counter 607 serves as the $\frac{1}{2}^n$ frequency divider to lead to counting of the output from the NAND gate 605.

As a result, when the frequency of clock pulse a is represented by fo, a pulse signal of the frequency of $$\frac{32-N}{32} \cdot \frac{1}{2^n} \cdot fo$$

is obtained from the NAND gate 608 and is input to the error counter 63.

Now, the error counter 63 is the 8-bit counter and starts to count the output pulses from the clock generator 62 at the leading edge of the output i from the phase reference signal generating unit 5.

Figure 4:
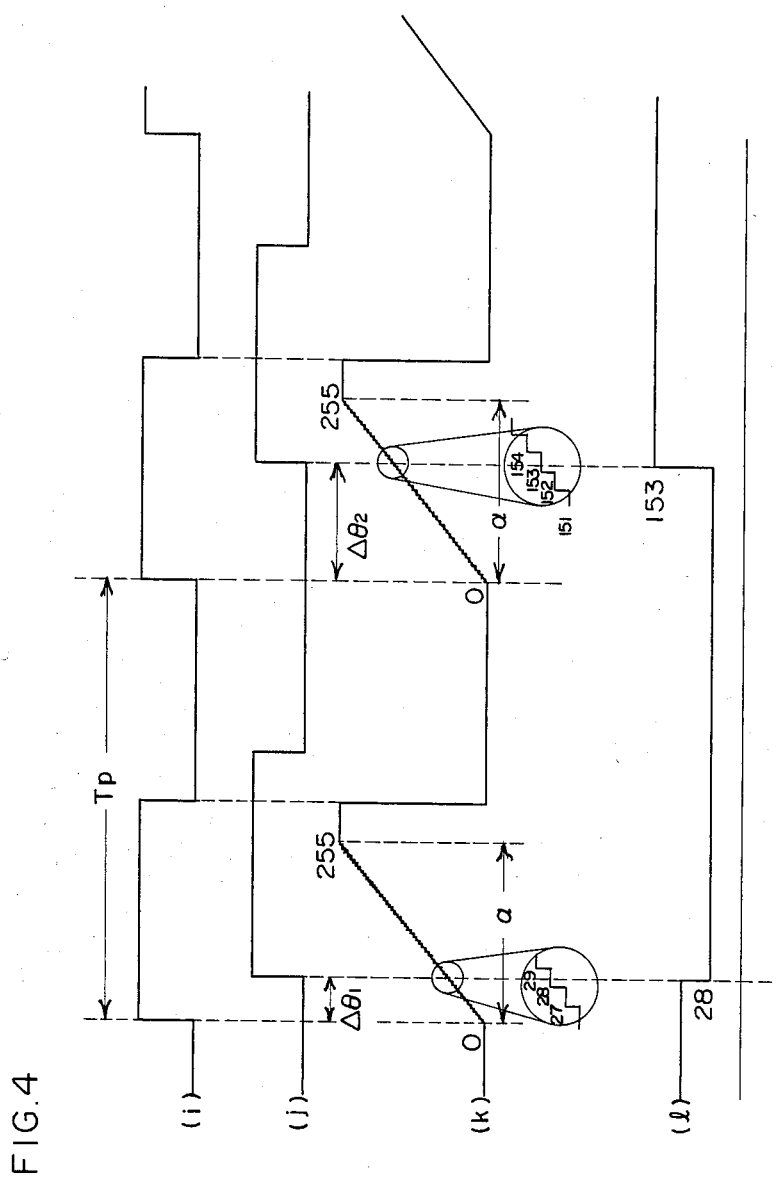
FIG. 4 is a timing chart explanatory of a phase control unit.

The count within the error counter 63, as shown in FIG. 4-(k), increases, and the counter stops counting when it reaches the full count value of 255, and is held at 255, and then is reset to a logic "0" when the signal i becomes a low level. The count k of error counter 63 is input to the latch circuit 64 and stored therein at the occurrence of the leading edge of output i of the rotary encoder 2. Accordingly, a value 1 (FIG. 4-(l)) stored in the latch circuit 64 corresponds to a time difference between the leading edge of signal i as a phase reference signal and the leading edge of the output signal j from the rotary encoder 2, in other words, a phase difference measured value $\Delta\theta_1$ or $\Delta\theta_2$ .... The rate of change of the count k, or the time period α of increasing the same from 0 to 255, depends on the values N and n set by the register 61, which means that N and n decide the detectable range of the phase difference.

In other words, a width of change in the output numerical value per unit phase difference, that is, the gain of phase control unit is variable according to N and n.

Figure 5:
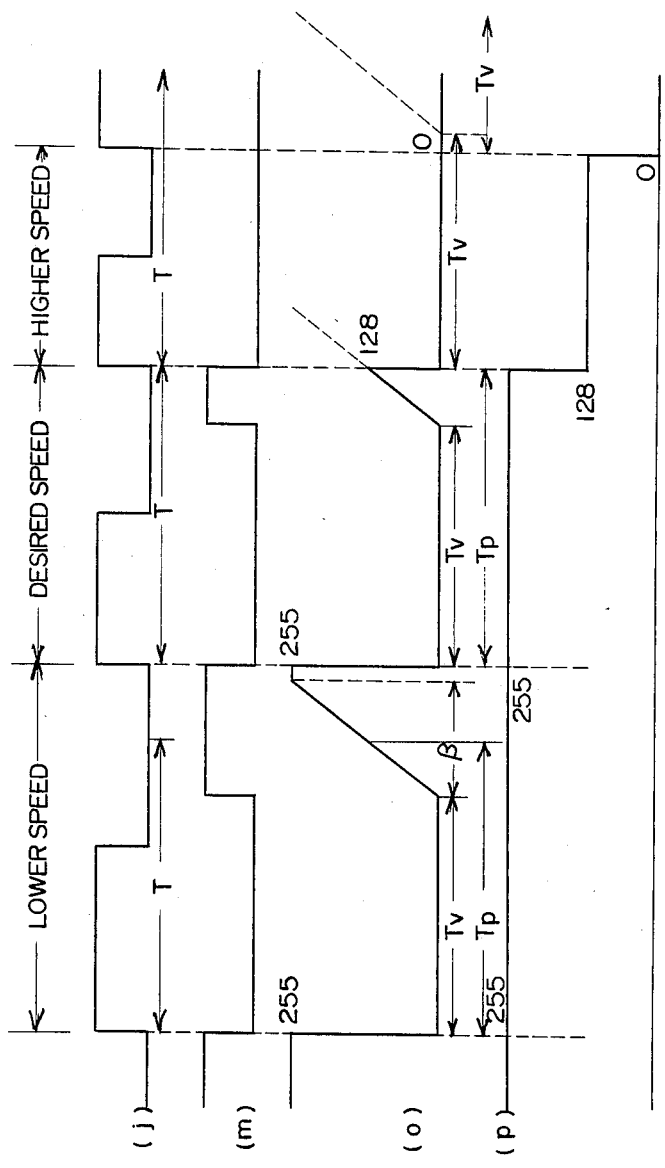
FIG. 5 is a timing chart explanatory of operation of a speed control unit.

Next, an explanation will be given on the speed reference signal generating unit 7 and speed control unit 8. The register 71 receives from the control unit 4 a numerical value corresponding to the cycle period T of output signal j when the rotary encoder 2 operates at the desired speed, and stores the numerical value and inputs it to the down counter 72. The down counter 72 presets the set numerical value of register 71 at the leading edge of output j of the rotary encoder 2 as shown in FIG. 5-(j) and starts the down counting of clock pulse a. The error counter 83 of the speed control unit 8 is reset to zero in synchronism with the leading edge of the output end is kept in its standby condition (FIG. 5-(o)). The down counter 72 down-counts the numerical value corresponding to the setting value of the register 71 (this time period is represented by Tv, as shown in FIG. 5-(o)) and outputs the high level borrow signal m (FIG. 5-(m)), and then stops counting, the error counter 83 being fed the signal m and starting to count the output of the clock generator 82, the stored counting increasing as shown in FIG. 5-(o). The error counter 83 is composed of eight bits and stops the counting after having counted from 0 to the full count 255, and stores 255. In addition, the borrow signal m from the down counter 72 is also input to the low active terminal of NOR gate $G_4$ of the pulse width modulator 10.

During the above counting, when the output j of the rotary encoder 2 rises, the count of error counter 83 is stored by the latch circuit 84 as shown in FIG. 5-(p) and the error counter 83 is rest to a logic "0".

The construction and operation of register 81 and clock generator 82 are the same as those of register 61 and clock generator 62 of the phase control unit 6, so that N and n set in the register 81 decide the rate of change of the count of the error counter 83 or the time period β from 0 to 255. When the speed of the motor 1 increases as shown in the right hand of the center in FIG. 5 and the cycle period of output signal j of the rotary encoder 2 is restricted, the next leading edge of signal j appears during the counting of error counter 83 or the counting of down counter 72, in which case the latch circuit 84 stores the count of the error counter 83 and the error counter 83 is then reset to a logic "0" in the same fashion as noted above.

Also, the numerical value set in the register 71 is so selected that the count time Tv of counter 72 is given by the following equation:

$$Tv = T - \beta/2$$

The reason for this is that when the motor 1 rotates at the desired speed, the time until the error counter 83 counts about 128, i.e.—about ½ of its full count of 255, is adopted. Hence, the content p of latch circuit 84, which is updated at every leading edge of output signal j of the rotary encoder 2, is obtained at numerical values of 0 to 255 with respect to a range of $(T+\beta/2)$ to $(T-\eta/2)$ around the cycle period T of signal j at the desired speed of the motor 1, the numerical values representing cynchronization thereof with the signal j on the basis of the speed reference signal shown in FIG. 5-(m).

The values N and n can decide β as noted above, which means that a variation width of the output numerical value per unit frequency deviation, that is, the gain of speed control unit 8, is variable by N and n, or the range of enabling detection of the frequency (speed)

deviation with respect to the whole variation width is variable.

In addition, in FIG. 5, the central portion shows the motor rotation at its desired speed, the left-hand portion shows the motor rotation at a lower speed, and the right-hand portion shows the motor rotation at a higher speed.

Figure 6:
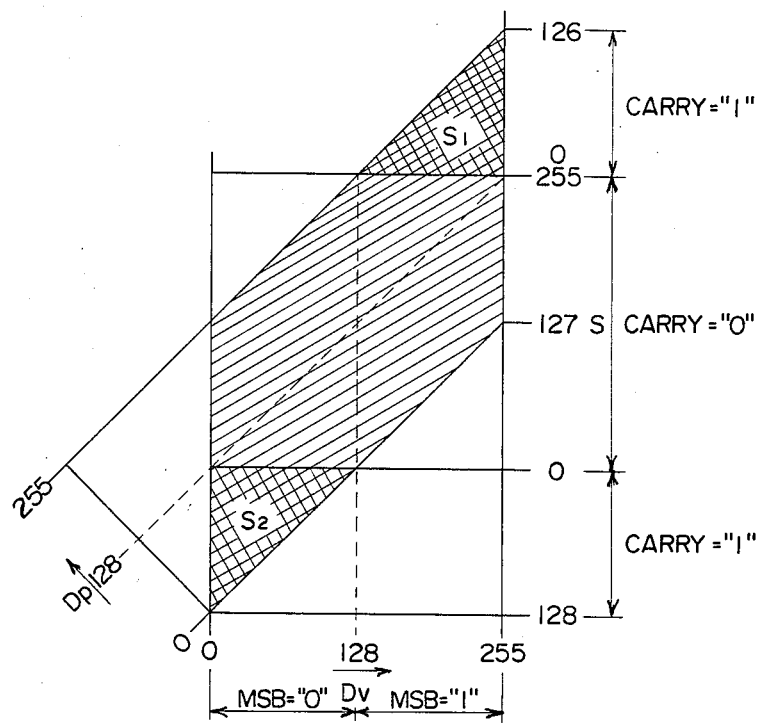
FIG. 6 is an illustration of computation results of a full adder.

In FIG. 1, reference numeral 9 designates a 8-bit full adder with carry, which adds an output numerical value Dp from the phase control unit 6, that is, the stored content of latch circuit 64 and an output numerical value Dv from the speed control unit 8, that is, a numerical value ($=Dv-128$) from the most significant bit (MSB) only of the stored content of latch circuit 84 which has been inverted by an inverter 91. The numerical value ($=Dv-128$) means a variation from the desired speed. FIG. 6 shows the added value S ($=Dp+Dv-128$), in which $Dv-128$ represents the value noted above and Dp represents a variation in phase, whereby the added value S is the sum of variations of the phase from the desired speed. Also, in FIG. 6, the axis of the abscissa represents Dv, the axis of the ordinate represents S, and Dp is taken in the direction inclining at an angle of 45° therefrom. A hatched area can exist as S and an overflow portion $S_1$, and an underflow portion $S_2$ in the 8-bit computation are cross-hatched and determined by a carry output (in which portions the carry goes to logic "1") and the MSB of Dv (where MSB=1 at $S_1$ and MSB=0 at $S_2$).

Referring again to FIG. 1, a 8-bit numerical value comparator 102 of the pulse width modulator 10 is fed the additional result S by the full adder 9 and AND gates $G_1$ and $G_3$ are fed the carry output of full adder 9, the speed control unit 8 inputting the MSB of Dv to the low active terminal of gate $G_1$ and to the other terminal of gate $G_3$. The output of gate $G_1$ and the carry output (which becomes a logic "1" when a count of 255 is reached) of error counter 83 are input to a NOR gate $G_2$ so that the output therefrom is fed to the low active direct-set terminal S of the D-flip-flop 103. The output of gate $G_3$ is input to the other input of a NOR gate $G_4$ and the output therefrom is input to the low active direct-reset terminal R of the D-flip-flop 103.

The 8-bit counter 101 continuously counts the clock pulse a generated by oscillator 3 and it output takes cyclic values of 0 to 255. The output of the counter 101 is input to the numerical value comparator 102 and compared therein with the added value S so that the numerical value comparator 102, when S exceeds the output of counter 101, outputs a logic "1" and when smaller than that, outputs a logic "0". Accordingly, the output of numerical value comparator 102 coincides in its cycle period with the count cycle of counter 101 and the pulse width is proportional to S. In brief, the larger a shift between the speed and the phase is, the larger the duty ratio of the pulse output becomes. The output of the numerical value comparator 102 is input to the data terminal D of the D-flip-flop 103. Since, the trigger terminal T of the D-flip-flop 103 is fed the clock pulse a, the D-flip-flop 103 shapes the output waveform of the numerical value comparator 102 and eliminates noise caused by a circuit delay.

In a case where an overflow or an underflow occurs in the full adder 9, the value S abruptly changes from 255 to 0 or vice versa, so that the output pulse width of the numerical value comparator 102 abruptly changes, thereby causing the control system to be unstable. Since the output signal from the phase reference signal generator 5 and that from the rotary encoder 2 are larger in a cycle period difference therebetween when the motor 1 starts or changes its speed, the output Dp of phase control unit 6 is not useful as the phase difference measuring value, whereby the output numerical value of full adder 9 generates unnecessary vibration which may cause the motor 1 to be unable to be accelerated or decelerated toward the desired speed. Hence, the gates $G_1$ to $G_4$ are used for eliminating such a problem.

In the case where an overflow occurs in the full adder 9 (the output of gate $G_1$ is a logic "1") and during the acceleration of motor 1, in other words, when the carry of error counter 83 goes to a logic "1" and the motor 1 speed is lower than its measurable range, that is, when either input at the NOR gate $G_2$ goes to logic "1", the gates $G_1$ and $G_2$ directly set the D-flip-flop 103 so that the output from the pulse width modulator 10, regardless of output values of full adder 9, is fixed to the maximum pulse width (duty ratio=100%). On the contrary, when an underflow occurs in the full adder 9 (the output of gate $G_3$ goes to logic "1") and during the deceleration of motor 1, in other words, when no borrow output appears from the counter 72 and the speed of motor 1 exceeds its measurable range, that is, when the output of NOR gate $G_4$ goes to logical "0", the gates $G_3$ and $G_4$ directly reset the D-flip-flop 103, whereby the output from the pulse width modulator 10 is fixed to the minimum pulse width (duty ratio of 0%).

Thus, the motor 1 is subjected to the abovementioned function and accelerated to a maximum when accelerated, and its drive stopped when being decelerated, thereby insuring that the desired speed is quickly obtained and control is stabilized.

In FIG. 1, reference numeral 11 designates a motor control signal outputting unit, which comprises a 2-bit register 111, and AND gates $G_5$ to $G_8$, and a NAND gate $G_9$. The register 111 is fed commands X and Y from the controller 4 for motor operation, and stores them. The X portion of 2-bit data of X and Y is input to the gates $G_6$, $G_7$ and $G_9$ and the Y portion is input to the gates $G_5$, $G_8$ and $G_9$. The output from the pulse width modulator 10 is input to the gates $G_5$ and $G_6$ and the output from the gate $G_9$ is given to the same. Also, the gates $G_5$, $G_6$, $G_7$ and $G_8$ are adapted to respectively control the turn-on turn-off of the switching transistors TR1, TR2, TR3 and TR4. Table 2 shows the relationship between the data X and Y, respective output of gates $G_5$ to $G_8$, on-off state of the respective transistors, and operation of motor 1. In the table 2, reference PWM represents the dependence on the output of pulse width modulator 10. In brief, in a case of normal rotation or reverse rotation in (X,Y)=(0,1) or (1,0), the speed depends upon the output of pulse width modulator 10.

TABLE 2

| (X,Y) | G$_5$ | G$_6$ | G$_7$ | G$_8$ | TR1 | TR2 | TR3 | TR4 | Motor Operation |
|---|---|---|---|---|---|---|---|---|---|
| (0,0) | 0 | 0 | 0 | 0 | off | off | off | off | Free |
| (0,1) | PWM | 0 | 0 | 1 | PWM | off | off | on | Normal Rotation |
| (1,0) | 0 | PWM | 1 | 0 | off | PWM | on | off | Reverse Rotation |
| (1,1) | 0 | 0 | 1 | 1 | off | off | on | on | Dynamic Braking |

Figure 7:
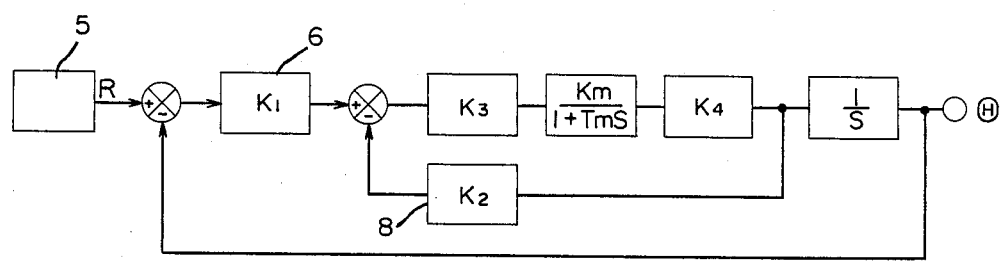
FIG. 7 is a block diagram of control for the FIG. 1 embodiment.

The servomotor controller of the invention constructed as foregoing is shown by a block diagram of a phase locked loop control as shown in FIG. 7, in which phase R of signal i output from the phase reference signal generating unit 5 is an input signal to the whole control system and phase $\theta$ of output signal j from the rotary encoder 2 is an output signal from the whole control system. The difference between the phases is input to the phase control unit 6 and the gain thereof is represented by $K_1$.

An output signal of speed control unit 8 whose gain is $K_2$ is added (−) to the output of phase control unit 6. Reference $K_3$ represents a gain of the bridge across the transistors TR1 to TR4, and Km and Tm are the constants of the motor 1, and $K_4$ is the number of pulses per one rotation of the rotary encoder 2. From these elements, the natural angular frequency $\omega n$ and the damping constant $\zeta$ of the control system are given by the following equations:

$$\omega n = \sqrt{\frac{K_1 K_3 K_4 Km}{Tm}}$$

$$\zeta = \frac{1 + K_2 K_3 K_4 Km}{2\sqrt{K_1 K_3 K_4 Km\, Tm}}$$

where $K_3$ is obtained as the constant from supply voltage V to the motor 1, $K_4$ is the number of pulses/rotation of the rotary encoder 2, and Km and Tm are constants from the motor and its load. Also, $K_1$ can be set desirably by the set values N and n of registers 61 in the phase control unit 6 and $K_2$ can similarly be set by the set values of register 81 in the speed control unit 8. In brief, the set values are selectable of the optimum values of $\omega n$ and $\zeta$ by both the registers 61 and 81.

In summary, regarding the rotation of motor 1 and the set values at the registers 51, 61, 71, 81 and 101, when the set values of registers 51 and 71 are represented by $S_{51}$ and $S_{71}$, and a cycle period of clock pulse from the oscillator 3 is represented by t, from the equations:

$$2t(S_{51}+1) = Tp$$

$$t(Sn+1) = Tp - \beta/2,$$

the equation $$S_{71} = 2(S_{51}+1) - \beta/2t$$

should hold. Hence, the set values stored in the registers 51 and 71 decide the rotational speed of motor 1, and the set values N and n stored in the registers 61 and 81 decide the behavior of variations in the number of rotations during the acceleration or the deceleration at starting or speed changing, and further the set values X and Y stored in the register 111 decide the rotation direction and braking or free rotation.

Accordingly, a copying machine having reduction and enlargement functions for various magnification need only be so constructed that the controller 4 prepares the set values suitable for the registers 51, 61, 71 and 81 corresponding to every magnification; the control unit (not shown) feeds to the controller 4 the signal corresponding to the selected magnification; the input signal is used to set the corresponding set value in each register 51, 61, 71 or 81, and the set values (X,Y) are set in the register 111 in the predetermined sequence to thereby rotate the motor 1. In addition, in a case where the copying machine is so constructed that the magnification for reduction or enlargement is continuously changeable, the equation giving the relationship between the numerical values to be set and the magnification need only be set in the controller 4.

Also, the pulse width modulator 10 may be replaced by a digital/analog converter used for generating an analog signal at voltage level corresponding to the output S of the full adder 9. In this case, the motor control signal output unit 11 need only use analog switches (transmission gates) instead of gates G$_5$ to G$_8$ and the bridge across the switching transistors TR1 to TR4 be replaced by a transistor bridge for linear amplifiers.

Figure 8:
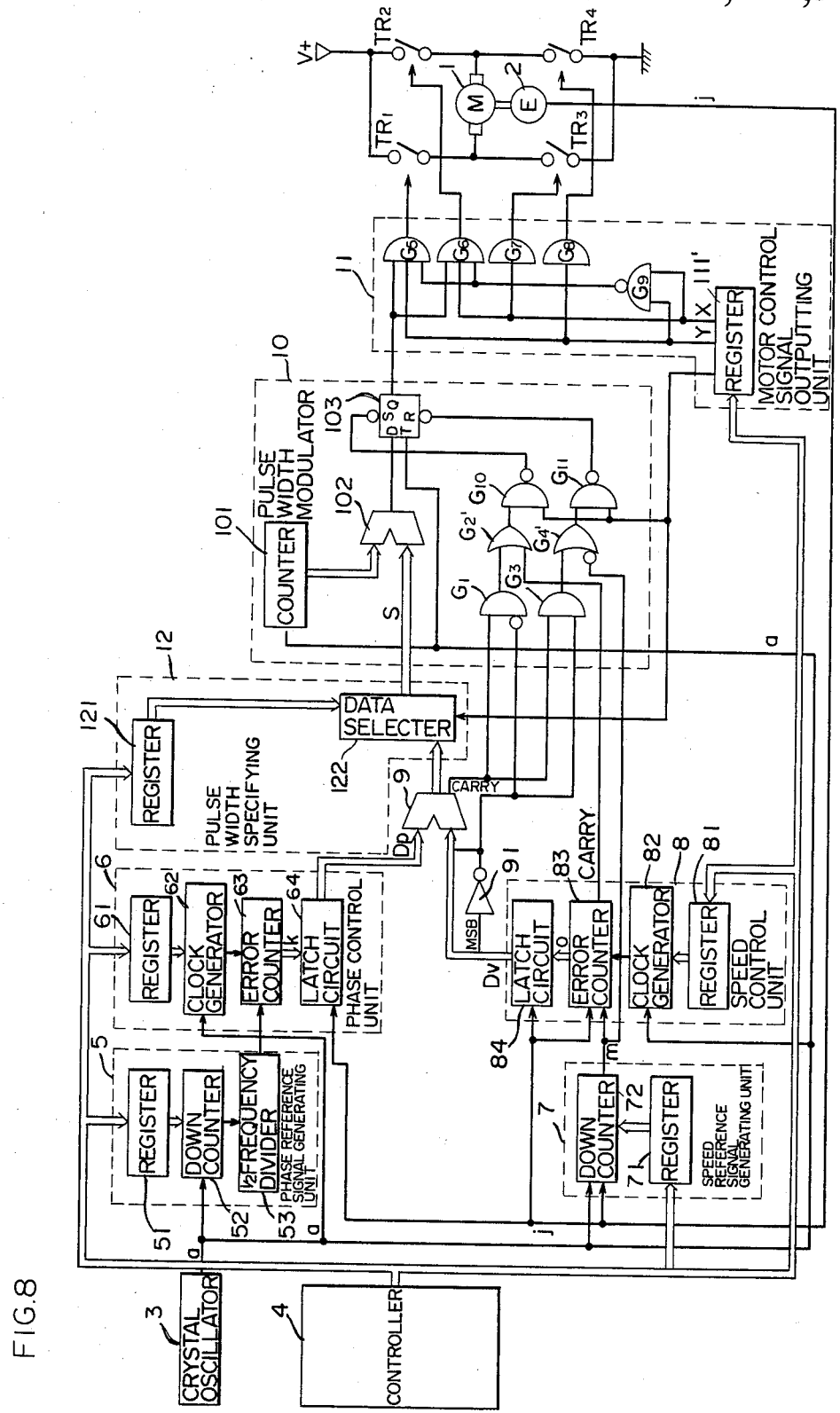
FIG. 8 is a block diagram of a modified embodiment of the invention.

Referring to FIG. 8, a modified embodiment of the invention is shown, which also is adapted to directly specify the duty ratio of the output of pulse width modulator 10, thereby enabling open-loop operation of motor 1. Next, an explanation will be given on the differences between this embodiment and the FIG. 1 embodiment. In addition, in FIG. 8, the components corresponding to those in the FIG. 1 are designated by the same reference numerals.

In the FIG. 8, reference number 12 designates a pulse width specifying unit, to which the data related to the rotational speed of motor 1, or the pulse width (duty ratio) of the output from the pulse width modulator 10, is input and set in an 8-bit register 121 of the pulse width specifying unit 12, the set value being input to a data selector 122. The data selector 122 is also fed the output S of full adder 9, so that either the set value or the input S is selected by a signal from a register 111' of the motor control signal output unit 11. The register 111' is different from register 111 of the FIG. 1 embodiment in that 3-bit data is set by the controller 4 so that one bit other than X and Y is a mode selecting signal. When this mode selection signal is a logic "1", the data selector 122 is allowed to select the output S from the full adder 9 as the phase locked loop control mode, the selected output S being input to a numerical value comparator 102 of the pulse width modulator 10, thereby being subjected to the phase locked loop control as noted above. On the contrary, when the mode selecting signal is a logic "0", the data selector 122 is allowed to select the content of register 121 as the pulse width directly specifying mode, the selected content being input directly to the numerical value comparator 102.

The pulse width modulator 10 is different from that in FIG. 1 in that OR gates $G_2'$ and $G_4'$ are provided instead of the NOR gates $G_2$ and $G_4$; the output of each OR gate $G_2'$ or $G_4'$ is input to one input of each NAND gate $G_{10}$ or $G_{11}$, and the other input thereof is used as the mode selecting signal, so that the outputs are input to the direct-set and reset terminals S and R of the D-flip-flop 103 respectively.

Hence, in a case where the mode selecting signal is a logic "0", the outputs of NAND gates $G_{10}$ and $G_{11}$ are fixed at a high level, thereby not directly setting or resetting the D-flip-flop 103. On the contrary, in a case where the mode selecting signal is a logic "1", the outputs of NAND gates $G_{10}$ and $G_{11}$ are equal to those of gates $G_2$ and $G_4$ in FIG. 1 respectively, thereby setting or resetting the D-flip-flop when phase locked-loop control is needed.

In this embodiment, when the mode selecting signal is a logic "1", the phase locked-loop control is carried out in the same fashion as the embodiment shown in FIG. 1, while, in a case where the mode selecting signal is a logic "0", the numerical value comparator 102 compares the content of counter 101 with that of register 121, thereby outputting from the pulse width modulator 10 the pulse width signal corresponding to the compared result. Hence, the open loop control operation of motor 1 is possible without being affected by the output of the rotary encoder 2. For example, when the rotational speed is reduced or the rotation direction is changed, for the phase locked loop control, the motor 1 is free or the dynamic braking is applied, but the mode selecting signal is put to a logic "0" and a proper value is set at the register 121, thereby enabling the motor 1 to be subjected to plugging. Also, it is possible to soft start at need the motor 1 by gradually increasing the speed.

Alternatively, the pulse width modulator 10 in this embodiment may be replaced by a digital/analog converter, in which the numerical value set in the register 121 corresponds to a voltage level to be output from the digital/analog converter.

As seen from the above, the servomotor controller of the invention can realize without error the control system of the optimum control characteristics by merely setting in each register a numerical value which has been derived by simple computation. Hence, the adjustment of circuit constants is not necessary so that even when the conditions of the motor or load is changed, the set value need only be selected, thereby being much simpler to effect than the determination of circuit constants in the conventional analog circuit.

The embodiments in FIGS. 1 and 8, except for the oscillator 3 and switching transistors TR1 to TR4, use gate arrays suitable for one-chip integration with ease, thereby obtaining a controller having a reduced number of parts and high reliability. In addition, when the digital/analog converter is used for the pulse width modulator, the converter is not included in the gate array, in which case, the pulse width modulation frequency causes no electrical or acoustical noise.

Also, the controller of the invention can feed to the motor the maximum power from its start time to thereby quickly obtain its desired speed. Hence, it is effective for miniaturization of the copying machine because its initial speed is reducible.

Furthermore, the embodiment of the invention in FIG. 8, as aforesaid, is reducible of the braking distance and enables soft starting by gradually increasing the rotational speed without feeding the maximum power, thereby having the superior effect.

Incidentally, the present invention is widely appplicable to various apparatus requiring the speed control with high accuracy as well as the copying machine example.

As this invention may be embodied in several forms without departing from the spirit of essential characteristics thereof, the present embodiment is therefore illustrative and not restrictive, since the scope of the invention is defined by the appended claims rather than by the description preceeding them, and all changes that fall within metes and bounds of the claims, or equivalence of such metes and bounds are therefore intended to be embraced by the claims.

What is claimed is:

1. A servomotor controller of a phase locked loop type comprising:
    a rotation detector arranged in association with said servomotor for outputting a phase signal corresponding to the rotation of said servomotor;
    a phase reference signal generating unit having a register means for storing data specifying a pulse cycle period of said phase reference signal;
    a phase control unit for detecting a phase difference between said phase reference signal and said output signal of said rotation detector and for outputting the detection results in numerical values;
    a speed reference signal generating unit having a registering means for storing data specifying a pulse width of said speed reference signal;
    a speed control unit which uses said speed reference signal for detecting the cycle period of said output signal of said rotation detector and for outputting the detection results in numerical values;
    a full adder for adding the outputs of said phase control unit and said speed control unit and for providing an output corresponding thereto;
    a signal converting unit for outputting a motor speed control signal corresponding to said output of said full adder;
    wherein said phase control unit includes a register means for storing data specifying a detectable range of phase difference with respect to the whole variation width of an output value of said phase control unit;

wherein said speed control unit includes a register means for storing data specifying a detectable range of a cycle period with respect to the whole variation width of the output value of said speed control unit;
and wherein said controller further comprises a controller means for providing signals for setting said register means of said phase and speed control units.

2. A servomotor controller as set forth in claim 1, wherein said phase control unit includes a circuit for thinning out a number of clock pulses determined by a thinning out part of said data from a predetermined number of clock pulses, a circuit means for frequency dividing a pulse train in an output from said thinning out circuit by a number determined by a dividing part of said data, and a counter for counting an output from said frequency dividing circuit, so that the value counted by said counter which is determined by a phase difference between said phase reference signal and said output signal of said rotation detector is used as an output of said phase control unit.

3. A servomotor controller as set forth in claim 1, wherein said speed control unit further comprises a circuit for thinning out a number clock pulses which are determined by a thinning out part of said data from a predetermined number of clock pulses, a circuit means for frequency dividing a pulse train in an output from said thinning out circuit by a number determined by a dividing part of said data, and a counter for counting an output of said frequency dividing circuit, so that the value counted by said counter which is determined by the pulse width of said speed reference signal and said output signal of said rotation detector is used as an output of said speed control unit.

4. A servomotor controller as set forth in claim 1, wherein said output of said speed control unit inverts the most significant bit thereof and inputs the inverted bit to said full adder.

5. A servomotor controller as set forth in claim 1, wherein said signal converting unit includes a pulse width modulating circuit which outputs a pulse signal of a duty ratio corresponding to the computation result of said full adder.

6. A servomotor controller as set forth in claim 5, including a logic circuit which causes said duty ratio of said pulse signal to be 1 or 0 when the computation result of said full adder is out of the predetermined range.

7. A servomotor controller as set forth in claim 1, wherein said signal converting unit includes a digital-/analog converter for outputting a voltage signal corresponding to the computation result of said full adder.

8. A servomotor controller of a phase locked loop type comprising:
a rotation detector arranged in association with said servomotor for outputting a pulse signal corresponding to the rotation of said servomotor;
a phase reference signal generating unit having a register means for storing data specifying a pulse cycle period of said phase reference signal;
a phase control unit for detecting a phase difference between said phase reference signal and said output signal of said rotation detector and for outputting the detection results in numerical values;
a speed reference signal generating unit having a register means for storing data specifying a pulse width of said speed reference signal;
a speed control unit which uses said speed reference signal for detecting the cycle period of said output signal of said rotation detector and for outputting the detection results in numerical values;
a full adder for adding the outputs of said phase control unit and said speed control unit and for outputting data corresponding to the computational results thereof;
a direct register means for storing data in connection with a motor speed control signal;
a selecting circuit for selecting either data stored from said direct register means or said data output from said full adder, and
a signal converting unit for outputting the motor speed control signal corresponding to the content selected by said selecting circuit;
wherein said phase control unit is provided with a register means for storing data specifying a detectable range of phase difference with respect to the whole variation width of an output value of said phase control unit;
wherein said speed control unit includes a register means for storing data specifying a detectable range of a cycle period with respect to the whole variation width of the output value of said speed control unit;
and wherein said controller further comprises a controller means for providing signals for setting said register means of said speed and phase control unit.

9. A servomotor controller as set forth in claim 8, wherein said phase control unit further comprising a circuit for thinning out a number of clock pulse which are determined by a thinning out part of said data from a predetermined number of clock pulses, a circuit means for frequency dividing a pulse train in an output from said thinning out circuit by a number determined by a dividing part of said data, and a counter for counting an output from said frequency dividing circuit, so that the value counted by said counter which is determined by a phase difference between said reference signal and said output signal of said rotation detector is used as an output of said phase control unit.

10. A servomotor controller as set forth in claim 8, wherein said speed control unit includes a circuit for thinning out a number of clock pulses determined by a thinning out part of said data from a predetermined number of clock pulses, a circuit means for frequency dividing a pulse train in an amount from said thinning out circuit by a number determined by a dividing part of said data, and a counter for counting an output of said frequency dividing circuit, so that the value counted by said counter which is determined by a pulse width of said speed reference signal and said output signal of said rotation detector is used as an output of said speed control unit.

11. A servomotor controller as set forth in claim 8, wherein said output of said speed control unit inverts the most significant bit thereof and inputs the inverted bit to said full adder.

12. A servomotor controller as set forth in claim 8, wherein said signal converting unit includes a pulse width modulating circuit which outputs a pulse signal of a duty ratio corresponding to the computation results of said full adder.

13. A servomotor controller as set forth in claim 12, including a logic circuit which causes said duty ratio of said pulse signal to be 1 or 0 when the computation result of said full adder is out of the predetermined range.

14. A servomotor controller as set forth in claim 8, wherein said signal converting unit includes a digital-/analog converter for outputting a voltage signal corresponding to the computation result of said full adder.

* * * * *